Jan. 17, 1961

O. K. KELLEY 2,968,379

VEHICLE BRAKE AND TRANSMISSION FLUID
ACTUATING AND COOLING SYSTEM

Filed Jan. 9, 1958

INVENTOR.
Oliver K. Kelley
BY
John T. Marvin
HIS ATTORNEY

Jan. 17, 1961 O. K. KELLEY 2,968,379
VEHICLE BRAKE AND TRANSMISSION FLUID
ACTUATING AND COOLING SYSTEM
Filed Jan. 9, 1958 4 Sheets-Sheet 2

INVENTOR.
Oliver K. Kelley
BY
John T. Marvin
HIS ATTORNEY

INVENTOR.
Oliver K. Kelley
BY
John T. Marvin
HIS ATTORNEY

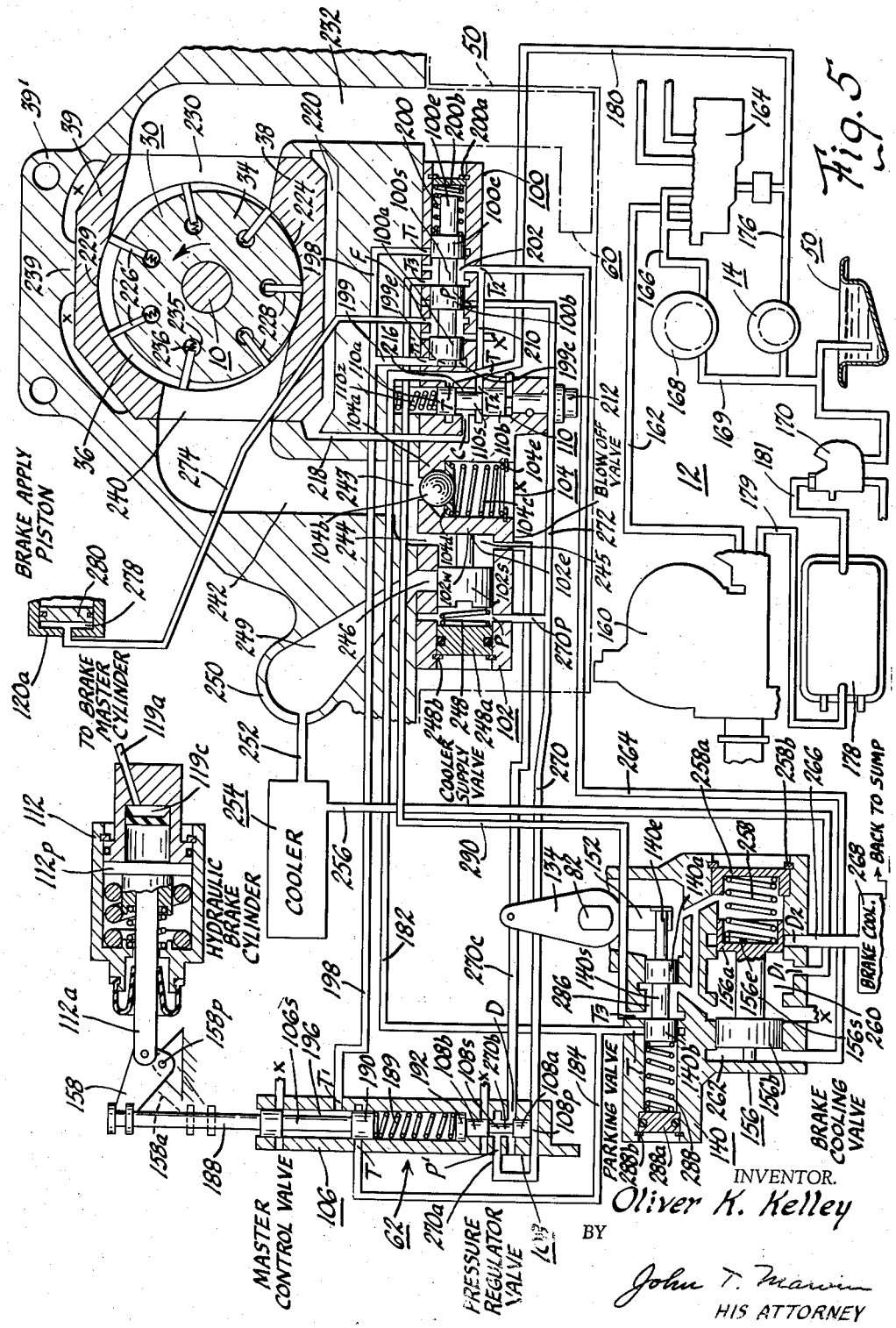

United States Patent Office 2,968,379
Patented Jan. 17, 1961

2,968,379

VEHICLE BRAKE AND TRANSMISSION FLUID ACTUATING AND COOLING SYSTEM

Oliver K. Kelley, Bloomfield Hills, Mich., assignor to General Motors Corporation, Detroit, Mich., a corporation of Delaware Filed Jan. 9, 1958, Ser. No. 708,034

9 Claims. (Cl. 192—4)

This invention relates to a system for governing flow of a fluid medium used in operation of a hydro-dynamic transmission to effect cooling of the fluid medium independently and also both in actuation and cooling of service brakes and in cooling of a parking on a motor vehicle, and, particularly, to a propeller-shaft-driven pump means capable of being actuated to effect service brake energization in proportion to propeller shaft speed and to effect flow of the fluid medium for cooling the fluid medium and for cooling the brakes on the vehicle.

An object of this invention is to provide a new and versatile system for governing flow of a fluid medium to effect actuation of vehicle brakes and also cooling of the brakes and cooling of the fluid medium independent of brake actuation and brake cooling using fluid medium from a hydrodynamic transmission on a vehicle.

Another object is to provide a system for governing the flow of a fluid medium from a hydrodynamic transmission on a vehicle in response to service brake actuation to effect application of the brakes in proportion to vehicle speed simultaneously with the cooling of the brakes.

Another object is to provide a system for governing flow of a fluid medium from a hydrodynamic transmission for cooling brakes actuated either manually or hydraulically.

Another object is to provide a system for cooling and actuating brakes on a vehicle having a propeller shaft pump means that is energized using a fluid medium from a hydrodynamic transmission on the vehicle and that pumps the fluid medium for cooling of the fluid medium itself due to energization of the pump means in response to a temperature sensitive valve means, that pumps the fluid medium for cooling of a manually actuated propeller shaft brake, and that pumps the fluid medium for cooling and actuation of service brakes in proportion to propeller shaft speed.

Another object is to provide a system for cooling brakes on a vehicle having a propeller shaft pump including a rotor having vanes cooperative with slide members shiftable under pressure exerted through fluid from a hydrodynamic-type automatic transmission.

Another object is to provide a system for governing flow of a fluid medium effected by a propeller-shaft-driven pump adapted to be actuated independently to cause flow of the fluid medium from a hydrodynamic transmission; first, by manual application of a propeller shaft brake to effect brake cooling flow of the fluid medium; second, by automatic temperature responsive actuation of thermal responsive valve means to effect cooling of the fluid medium itself for use in the hydrodynamic transmission; and, third, by hydraulic actuation of the service brakes to effect cooling of the service brakes and also to effect a power assist to service brake actuation in proportion to propeller shaft speed and providing dynamic braking in proportion to vehicle speed.

A further object is to provide a system for brake cooling including a propeller-shaft-driven pump to effect circulation of a cooling fluid medium from a hydrodynamic transmission of a vehicle in response to brake actuation.

Another object is to provide a system for effecting cooling of a fluid medium used during brake application and in a hydrodynamic transmission using a dispatch valve means to govern channeling of the fluid medium to effect actuation of a brake cooling valve, and to effect actuation of a valve means responsive to temperature of the fluid medium itself to cause cooling of the fluid medium and actuation of the pump independent of brake operation and brake cooling.

Further objects and advantages of the present invention will be apparent from the following description, reference being had to the accompanying drawings wherein a preferred embodiment is shown.

Fig. 5 is a schematic diagram of a system in accordance with the present invention including a fragmentary cross sectional elevational view taken along line 5—5 of Fig. 1.

Fig. 6 is a fragmentary plan view of brake actuating mechanism taken in the direction of arrow 6 in Fig. 3.

Figure 1:
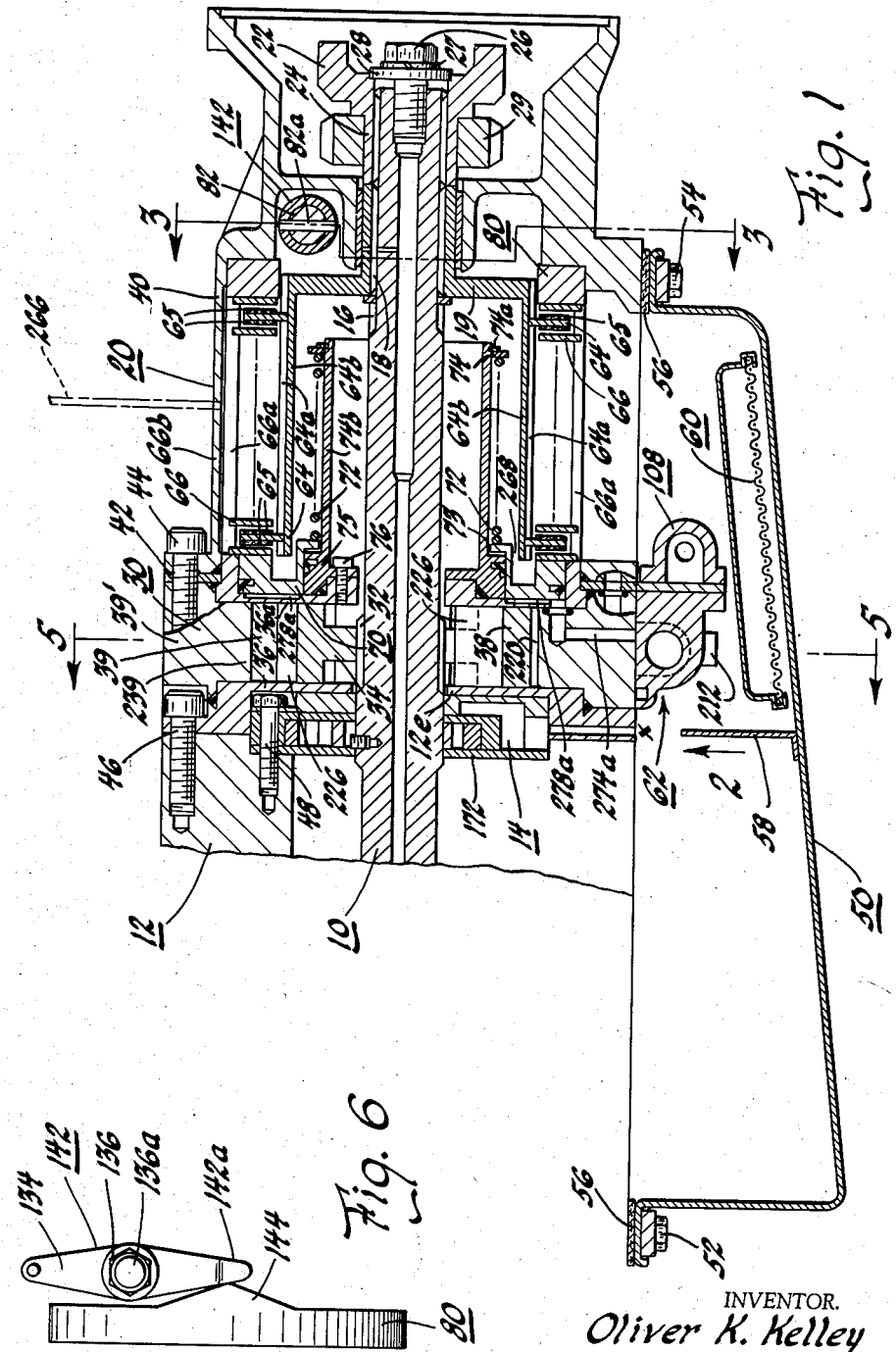
Fig. 1 is a fragmentary cross sectional elevational view of a portion of components and a system in accordance with the present invention.

With particular reference to Fig. 1, there is shown a propeller shaft generally indicated by numeral 10 which is driven by a vehicle engine (not shown) through a hydrodynamic transmission, a portion of which is generally indiacted by numeral 12. The transmission 12 includes a rear oil pump generally indicated by numeral 14 which will be further referred to later in the specification. The propeller shaft 10 extends through the hydrodynamic transmission to a location to the right of the rear oil pump 14 of the transmisison. This extension of the propeller shaft 10 actually is toward the rear of the vehicle where there is a splined end portion 16 on the propeller shaft which engages splines 18 of a rotatable annular member 19 that is part of a propeller shaft brake means generally indicated by numeral 20. Also shown in Fig. 1 is a portion of a universal member 22 having an internally splined reduced diameter portion 24 engagable with the splined portion 16 of the propeller shaft. A bolt 26 and a pair of washers 27 and 28 retain the universal joint member 22 in engagement with the end of the propeller shaft 10. A speedometer pinion gear 29 is suitably secured such as by press fitting to the outer periphery of the reduced diameter portion 24 of the universal joint member 22.

The propeller shaft 10 is journalled in the rear of the transmission 12 relative to a centrally apertured end plate 12e adjacent to which a propeller-shaft-driven pump means generally indicated by numeral 30 is mounted. The propeller-shaft-driven pump means 30 is located between the rear of the hydrodynamic transmission and a forward end of the propeller shaft brake means 20. The propeller shaft 10 is provided with a plurality of intermediately located external splines 32 for engaging and driving a rotor member 34 of the pump means 30. The rotor member cooperates laterally with stationary end or side portions 36 and 36a of the pump means and radially with slide members 38 and 39 which are shiftable under pressure of a fluid medium channeled adjacent thereto from the rear oil pump 14 of the hydrodynamic transmission 12 as will be explained in further detail below.

The pump means 30 driven by the propeller shaft is enclosed by a suitable housing 39' to which is attached a housing extension 40 enclosing the propeller shaft brake means 20, the speedometer pinion gear 29 and the universal gear member 22. The housing extension 40 has a flange portion 42 through which bolts 44 are fitted to attach the housing extension 40 to the pump means housing 39'. Similarly, bolt means 46 are provided to attach the pump means end portion 36 to the rear of the transmission 12. Bolt means 48 serve to attach the rear oil pump 14 to the rear of the transmission 12. A pan or reservoir means generally indicated by numeral 50 is secured by bolts 52 and 54 to the bottom of the transmission 12 and housing extension 40, respectively. A suitable gasket means 56 is preferably provided between the reservoir or pan and the transmission and housing extension as a fluid seal. The pan may be provided with a vertical baffle means 58 at an intermediate portion of the bottom thereof to serve as a damping means for hindering extensive splashing of a fluid medium used in the system of the present invention and also in the hydrodynamic automatic transmission of the vehicle.

The reservoir 50 forms a sump which will be referred to in the operation of the system of the present invention. An intake screen means generally indicated by numeral 60 is provided in the sump for the purpose of filtering fluid medium which is removed from the sump through operation of the propeller-shaft-driven pump means 30 as will be seen with the schematic diagram of Fig. 5 during the operation of the system in the present invention.

A valve means generally indicated by numeral 62 is secured to the bottom of the housing of the pump means 30 as shown in Fig. 1. The function of the valve means will become apparent with the description of the operation of the system outlined with Fig. 5.

The propeller shaft brake means 20 illustrated in Fig. 1 includes the annular member 19 connected through splines 18 to the splined end portion 16 of the propeller shaft 10. The propeller shaft brake means 20 preferably is formed as a disc type brake mechanism including a plurality of rotatable discs 64 cooperable with a plurality of stationary discs 66. The rotatable discs 64 are attached to splines 64a of an annular portion 64b of the rotatable member 19. Each of the rotatable discs 64 is provided with a facing means 65 bonded on opposite sides of each disc 64. The facing means 65 is formed of a friction material which is engageable with annular surfaces of the sides of the stationary discs 66. The stationary discs 66 are formed of annular pieces of metal having radially outwardly extending slots engageable with splines 66a carried by a fixed portion 66b rigidly secured to the inner periphery of the stationary housing extension 40. The discs 66 are stationary relative to the rotatable discs 64 but the discs 66 can be moved longitudinally, concentrically, and axially of the propeller shaft 10 along the splines 66a so that during propeller shaft brake actuation the frictional facings 65 engage the annular side surfaces of the discs 66.

The discs 64 and 66 are actuated to engage each other through longitudinal movement of an annular fluid pressure transmitting member generally indicated by numeral 70. The member 70 shifts to the right as seen in Fig. 1 against the bias of a compression spring 72 disposed between a radially inwardly extending flange portion 73 of the member 70 and a stop means or abutment ring 74 adjacent a snap ring 74a fitted peripherally about longitudinal projection(s) 74b extending parallel to shaft 10 from an end of a stationary cylinder member 75 attached by bolts 76 to the housing of the pump means 30. The discs 64 and 66 can also be actuated relative to each other for engagement of the friction facing 65 relative to the discs 66 by using a manually shiftable annular ring generally indicated by numeral 80. The ring 80 functions as a brake pressure plate which is longitudinally and axially shiftable relative to the axis of the propeller shaft 10 through a linkage connected to a shaft 82 shown in the cross section of Fig. 1. The linkage of the shaft 82 and the brake pressure plate or ring 80 will be described in further detail in Figures 3, 4, and 6.

Figure 2:
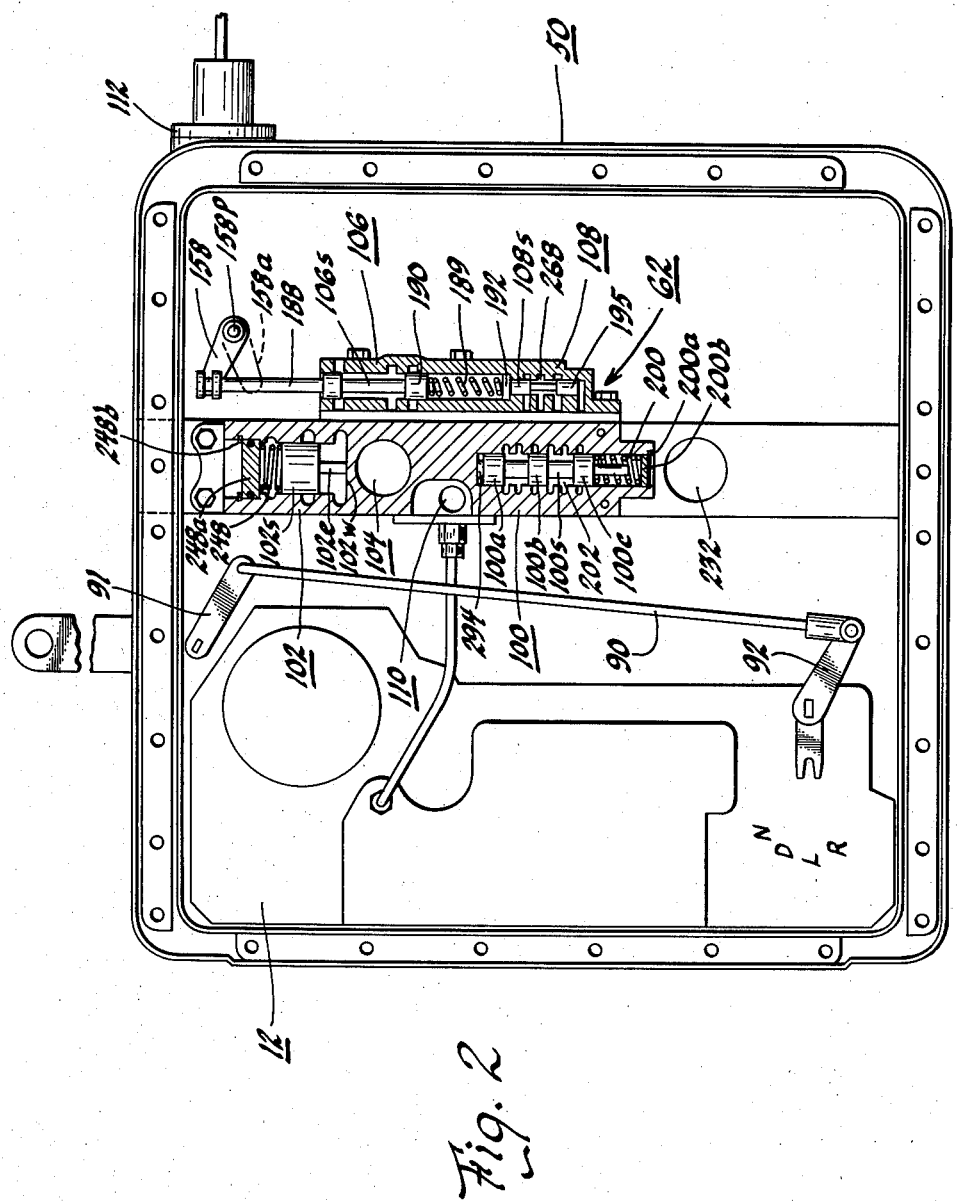
Fig. 2 is a plan view of a portion of the components of the system taken in the direction of arrow 2 in Fig. 1.

Fig. 2 is a plan view of a portion of the components of the system taken in the direction of arrow 2 in Fig. 1 showing the outline of the reservoir 50 which is attached to the bottom of the transmission 12 and housing extension 40 with a gasket 56 provided for sealing purposes between the reservoir, transmission and housing extension. The reservoir 50 is cut away to show the bottom of a hydrodynamic transmission having a drive selector lever generally indicated by numeral 90 connected between arms 91 and 92 for selectively setting the transmission in various vehicle driving positions such as reverse, low or neutral as indicated by the letters R, L, D and N respectively in Fig. 2. The operation and function of the hydrodynamic transmission is conventional and does not form a part of the present invention. Therefore the operation of the hydrodynamic transmission is not being set forth in detail at this time.

Fig. 2 shows further detail of the valve means 62 provided in the present system for channeling fluid medium from the hydrodynamic transmission to the system of the present invention. The valve means generally indicated by numeral 62 include a dispatch valve generally indicated by numeral 100, a cooler supply valve generally indicated by numeral 102, a blow-off valve generally indicated by numeral 104, a master control valve generally indicated by numeral 106 and a pressure regulator valve generally indicated by numeral 108. A temperature or thermal responsive valve means which may be termed a "vernatherm" generally indicated by numeral 110 is provided with the valve means 62. The function of these various valves will be described in further detail with the schematic diagram of Fig. 5.

The view of Fig. 2 also shows a portion of a hydraulic brake cylinder 112 which receives fluid under pressure from a master cylinder of a hydraulic brake system of a conventional type provided with the motor vehicle. The hydraulic brake system is shown schematically in Fig. 3 together with a fragmentary cross sectional elevational view taken along line 3—3 of Fig. 1.

Figure 3:
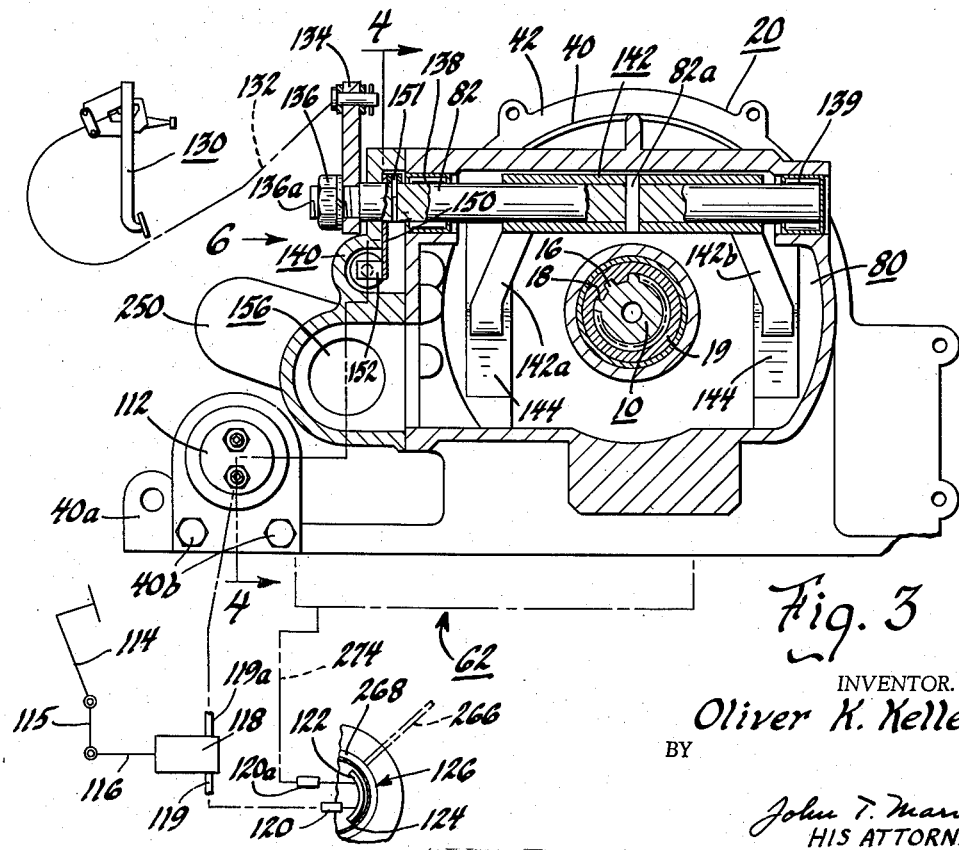
Fig. 3 is a fragmentary schematic diagram of brake actuating mechanism in the system of the present invention together with a cross sectional elevational view taken along line 3—3 of Fig. 1.

Fig. 3 shows a brake pedal 114 for service brake actuation connected by bell crank linkage 115 to a push rod 116 effective to displace brake fluid medium from a master cylinder 118 through lines 119 and 119a. The line 119 is connected to transmit fluid under pressure to a wheel cylinder 120 for actuating a friction brake shoe 122 which can be engaged against an inner periphery of a brake drum 124 provided with a wheel 126 of a motor vehicle. The line 119a is connected with the hydraulic brake cylinder 112 mounted with the reservoir and housing extension of the present invention. As seen in Fig. 3, the housing extension 40 has a laterally extending portion 40a to which the hydraulic brake cylinder 112 is secured by bolts 40b. Thus when the service brake pedal 114 is actuated through foot pressure, fluid medium is displaced by movement of a piston inside the main brake cylinder 118 by axial movement of the push rod 116 to effect flow of fluid medium under pressure to both the wheel cylinder 120 and the hydraulic brake cylinder 112 associated with the system of the present invention. The purpose of this simultaneous channeling of fluid medium from the master cylinder 118 to both wheel cylinder 120 and cylinder 112 will become more apparent with the description of the operation of the schematically illustrated hydraulic system of Fig. 5.

In addition to the hydraulic actuation of the brakes indicated with the schematic portion of Fig. 3, a manual actuation of the propeller shaft brake can occur through the shaft 82 referred to with the description of Fig. 1. This manual application of the propeller shaft can be effected through any suitable linkage means and is represented in Fig. 3 to be effective through a parking brake foot pedal lever generally indicated by numeral 130. The parking brake foot lever can be connected through a suitable connecting linkage or cable 132 which is attached to a linking means or arm 134 secured by a bolt 136 to a threaded end 136a of the shaft 82. Movement of the lever 130 effects movement of the cable 132 to turn the arm 134 in a clockwise or counterclockwise direction. A suitable latching mechanism may be provided to permit locking or setting of the parking or propeller shaft brake whenever manual actuation thereof is effected through the lever 130. This latching or locking mechanism does not form part of the present invention and therefore is not being described in detail. Movement of the arm 134 in either of opposite directions effects a rotation of the shaft 82 for manual setting or releasing of the discs 64 and 66 into or out of engagement relative to each other.

The shaft 82 is journalled relative to the housing extension 40 through pin or roller-type bearing means 138 and 139. Turning of shaft 82 results in actuation of a parking valve 140 as well as in actuation of the ring or back pressure plate 80. The axial or longitudinal movement of the back pressure plate 80 results from force transmitted by the shaft 82 through a pin 82a to a yoke member generally indicated by numeral 142 having downwardly extending arms 142a and 142b which engage an annular side or cam portion 144 of the pressure plate 80. The cam portion 144, the arms 142 and 142a as well as the arm 134 are visible in Fig. 6 which is a side view taken as indicated by arrow 6 in Fig. 3. The bolt 136 for attachment of the arm 134 to the threaded end 136a of the shaft is visible in Fig. 6 as well as in Fig. 3. Clockwise movement of the arm 134 results in axial shifting of the brake pressure plate 80 to the left as seen in Fig. 1 such that the discs 64 and 66 are moved adjacent to each other and the friction material causes braking action to occur between the discs 64 movable with rotation of the shaft 10 relative to the stationary discs 66 non-rotatable through the splines 66a relative to the stationary housing extension 40.

Figure 4:
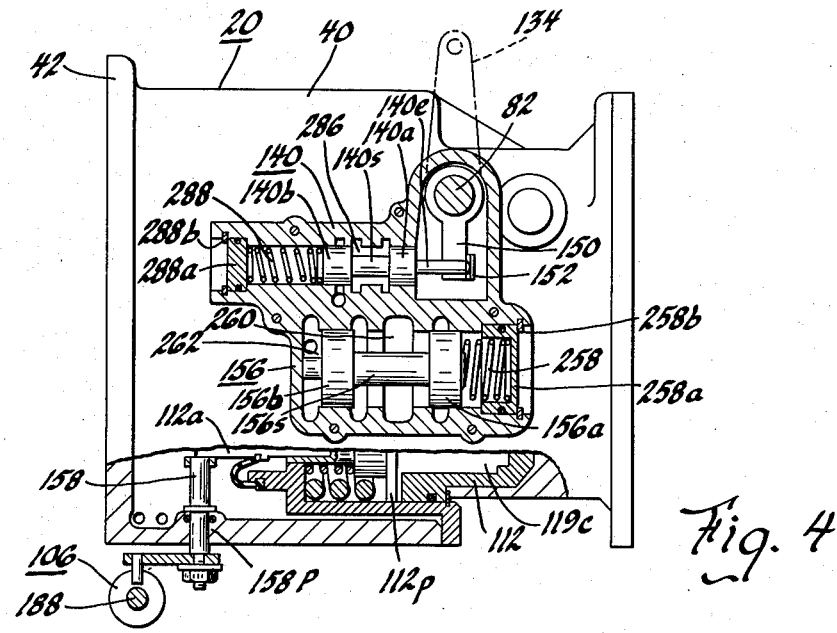
Fig. 4 is a cross sectional elevational view taken along line 4—4 of Fig. 3.

Clockwise movement of the shaft 82 as caused by the arm 134 also effects clockwise movement of an actuating arm generally indicated by numeral 150 which is attached by a pin 151 to rotate with the shaft 82 as indicated in Fig. 3. The pawl as seen in Figures 3 and 4 has a flange portion 152 that engages an end 140e of a spool 140s of a parking valve generally indicated by numeral 140. The purpose of the parking valve 140 will become apparent with the description of the operation of the system in the present invention with reference to the schematic diagram of Fig. 5.

In addition to showing the parking valve 140, Fig. 4 shows a cross sectional elevational view of a brake cooling valve 156 which functions to connect various conduits to permit brake cooling flow of a fluid medium as will be described with the schematic representation of the invention in Fig. 5. Fig. 4 also shows a fragmentary cross sectional view of the hydraulic brake cylinder 112 mentioned with the structures of Figures 2 and 3. A linkage is visible in Fig. 4 for transmitting force from the hydraulic brake cylinder 112 to effect shifting of a valve spool in the master control valve 106 mentioned with Fig. 2. This linkage indicated by numeral 158 in both Figures 2 and 4 can be of any suitable type to translate longitudinal movement of a piston inside the cylinder 112 into lateral movement for shifting of a spool 106s inside the master control valve 106. The specific linkage is not part of the present invention and therefore is indicated only generally in the drawings. In any event, actuation of the foot pedal 114 illustrated in Fig. 3 effects fluid medium displacement from the main hydraulic cylinder 118 of the hydraulic brake system through conduit 119a to cause longitudinal movement of a piston 112p inside the hydraulic brake cylinder 112 causing movement to be transmitted to a piston rod 112a through the linkage 158 to shift the master control valve spool 106s to an actuated position indicated by the phantom line linkage positioning 158a in Fig. 2.

The system of the present invention as illustrated in Fig. 5 includes a hydrodynamic automatic transmission generally indicated by numeral 12 in Fig. 1. The automatic transmission includes a hydrokinetic torque transfer mechanism or torque device 160 connected through a conduit 162 to a pressure regulator valve 164. The pressure regulator valve is connected by a conduit 166 to a front oil pump 168 driven concurrently with the engine or propeller shaft 10 which, in turn, provides fluid flow through a conduit 169 from the sump 50 to conduit 166 and valve 164. Some of the oil or transmission fluid is circulated through the conduit 162 through hydrokinetic torque transfer mechanism 160. The rear oil pump 14 mentioned in description with Figures 1 and 5 is driven only when the propeller shaft 10 rotates. The rear oil pump provides fluid flow through conduit 176 to the pressure regulator valve 164 when the vehicle is in motion. A check valve can be provided between conduit 176 and the pressure regulator valve 164. A conduit generally indicated by numeral 180 is connected through the conduit 176 from the rear oil pump 14 to a port T at one end of a conduit 182 that transmits fluid medium from the transmission to the parking valve 140. Connected to the conduit 182 is a line 184 that transmits fluid medium from the transmission to a port T of the master control valve 106 mentioned with Fig. 2. The results of actuation of the parking valve 140 of the master control valve 106 will be explained in further detail below.

The automatic transmission shown schematically in Fig. 5 is further provided with an oil cooling means including an oil cooler 178 connected by a conduit 179 with the torque multiplying device 160 to cool the oil used in the torque converter. A conduit 181 connects the oil cooler 178 to a lubrication pressure regulator 170 as shown by the schematic illustration of Fig. 5.

Fluid medium under pressure can be forced through the conduit 176 from the rear oil pump 14 of the hydrodynamic transmission through the conduit 180 to port T of the dispatch valve means 100. The fluid medium supplied to port T of the dispatch valve means 100 is used in the system of the present invention. Upon actuation of the foot pedal 114 mentioned earlier, the hydraulic brake cylinder 112 will receive fluid under pressure from the brake master cylinder by way of line 119a. As seen in Fig. 5, the fluid under pressure is supplied to a chamber 119c thereby causing displacement of piston 112p in the cylinder 112. Rod 112a is moved by this piston 112p to effect movement of linkage 158 about a fixed pivot 158p causing linkage 158 to be moved to a position indicated by phantom lines 158a. Through movement of the piston 112p and linkage 158, a rod 188 connected to spool 106s of the master control valve 106 is shifted downwardly against a spring bias provided by a resilient means 189 placed between an end land 190 of the spool 106s of the master control valve 106 relative to an end 192 of a spool 108s of the pressure regulating valve 108. Movement of the spool 106s of the master control valve 106 downwardly through actuation of the service brakes causes the land 190 to move clear of a port or orifice T of the master control valve 106. This connects the port T of the master control valve 106 by way of an annular chamber 196 formed around the spool 106s to a port T₁ of the master control valve 106 to a conduit 198 communicating with a port T₁ of the dispatch valve 100. The conduit 198 also connects through a line 199 with a port T₁' provided with the dispatch valve for supply of transmission fluid medium to an end chamber 199c formed at one end of a spool 100s of the dispatch valve 100. Fluid under pressure in the end chamber 199c forces a land 100a to the right thereby shifting the spool 100s against a spring 200 that biases the spool 100s through a land 100c toward the left as viewed in Fig. 5. A snap ring 200a and end sealing member 200b serve to close off the right hand end of the dispatch valve 100 and also serve as a seat for the right end of the spring 200 and serve as a stop engageable by a reduced diameter end portion 100e of the spool 100s to limit shifting movement of the spool in a direction to the right as seen in Fig. 5. In any event, whenever the service brakes are actuated to connect ports T and T₁ of the master control valve 106 for supply of fluid medium from the transmission through conduits 180, 182, 184, 198, and 199, the spool 100s is shifted to the right due to fluid pressure in end chamber 199c. This connects port T₁ of the dispatch valve 100 through an annular space 202 formed between land 100b and land 100c of the spool 100s to a port T₂. At the time that the spool 100s is shifted to the right due to fluid pressure in the end chamber 199c, the land 100b blocks fluid communication between port T₂ and a port T₃ of the dispatch valve. The purpose for port T₃ will be more fully understood from a description of the operation of the system in the present invention upon manual actuation of braking means provided with the vehicle.

In any event, whenever the hydraulic actuation of the service brakes causes shifting movement of the master control valve spool 106s, fluid under pressure in chamber 199c causes shifting of the spool 100s thereby moving land 100c in the dispatch valve 100 to connect port T₁ with port T₂ and to block T₃ from communicating with port T₂. The fluid medium from the transmission channeled from conduit 198 by way of ports T₁ and T₂ of the dispatch valve 100 is channeled first by way of conduit 210 to a port T₂ of a thermal responsive valve means or "Vernatherm" generally indicated by numeral 110. The "Vernatherm" has a downwardly extending end portion 212 which extends into the sump or reservoir 50 described with Fig. 1. The level of transmission fluid medium stored in the sump of reservoir 50 is of sufficient depth so that the fluid medium contacts the end portion 212 of the "Vernatherm." Thus the end portion 212 is subject to the temperature of the transmission fluid medium in the sump 50 and any increase in temperature will conduct heat to the "Vernatherm" for effecting an expansion of a thermal responsive or thermal expanding means retained preferably in the end portion 212 such that a spool 110s of the "Vernatherm" 110 can be shifted upwardly in response to an increase in temperature of the transmission fluid in the sump 50 beyond a predetermined temperature range. Preferably, the "Vernatherm" provided in the system of Fig. 5 does not effect a shifting of the spool 110s until a predetermined temperature ranging above a minimum predetermined value such as 250° or 280° is reached in the transmission fluid medium contained by the sump 50 and therefore the "Vernatherm" spool operates against a rate spring 110z.

Thus assuming first that the temperature of the fluid medium contained in the sump 50 is below the predetermined medium of 250° or 280°, the spool 110s is located as indicated in Fig. 5 in a downward position. In this position, the port T₂ of the "Vernatherm" 110 is connected through an intermediate annular space 216 formed between lands 110a and 110b of the spool 110s of the "Vernatherm" 110 and connects with a port C of the "Vernatherm" 110 which communicates through a conduit 218 with a chamber 220 adjacent pump slide member 38. This slide member 38 has an arcuate upper surface 224 which is cooperable with and engaged by pump vanes 226 radially movable in slots 228 of the rotor 34 carried by the rotatable propeller shaft 10 as described with Fig. 1. Vanes 226 are also cooperable with and engaged against an arcuate surface 229 of pump slide member 39 between side portions 36 and 36a.

The propeller shaft pump means 30 mentioned with Fig. 1 and illustrated schematically in Fig. 5 has an inlet chamber 230 which is connected through a conduit 232 to the intake screen means 60 mentioned with Fig. 1 and shown in phantom in Fig. 5 together with a phantom outline of sump 50 representing actual location of the sump 50 schematically shown elsewhere in Fig. 5. This screen means 60 is located in the sump 50 for channeling transmission fluid medium from the sump through conduit 232 to the inlet chamber 230. The vanes 226 of the propeller shaft pump means 30 cooperate with the arcuate surfaces of the slide members for pumping action whenever the slide member 38 is forced upwardly into cooperation with the rotor 34 and vanes 226 due to transmission fluid medium under pressure in the chamber 220. The slide member 39 is complementary to slide member 38 and is biased normally downwardly due to its own weight and gravity causing the member 39 to move into engagement with vanes 226. The vanes 226 can be biased radially outwardly by springs 235 in chambers 236 adjacent to the slots 228 of the rotor 234. The housing 39' of the pump means 30 provides a downwardly extending abutment or stop means 239 against which the upper slide member 39 is forced during pumping action of the pump means 30. Transmission fluid medium is thus pumped from the sump 50 through the inlet chamber by way of cooperating vanes, slide members, and the rotor of the pump means 30 to an output chamber indicated by numeral 240. The pumping action occurs when both the propeller shaft 10 is rotating the rotor 34 and the transmission fluid medium is supplied under pressure to the chamber 220 due to service brake actuation affecting the master control valve and the dispatch valve as described above. Even through the propeller shaft can rotate pump rotor 34 when there is no fluid pressure supplied to chamber 220, the weight of member 38 causes downward movement thereof away from the rotor. Similarly, member 39 can slide slightly downwardly until arcuate surfaces 224 and 229 are each concentrically spaced relative to the rotor and resultant pumping effect is nil. During counterclockwise rotation of rotor 34 while arcuate surfaces of members 38 and 39 are concentric relative to the rotor, any fluid displaced by vane 226 from chamber 230 to chamber 240 and vice versa is equal in opposite directions. Only when fluid is supplied under pressure to the chamber 220 is there an upward shifting of member 38 resulting in eccentric relationship between the arcuate surfaces 224 and 229 relative to the rotor 34 causing fluid displacement in only one direction.

When fluid medium under pressure flows through the outlet chamber 240 during upward positioning of member 38 by fluid pressure in chamber 220, the fluid medium passes through a conduit 242 to a chamber 243 in the pump means housing at a location adjacent to the cooler supply valve 102 and the blow-off valve 104 mentioned with Fig. 2. The purpose of the blow-off valve is to provide a safety relief governing maximum fluid pressure in the chamber 243 from the conduit 242 and outlet chamber 240 of the pump means 30. Thus excess fluid under pressure is dumped from point x below blow-off valve 104 to the sump before any damage due to excessive fluid pressure can be done to a cooler 254 to be referred to later in the specification. The blow-off valve preferably includes a valve seat 104a against which a ball valve member 104b is biased by a compression spring 104c. The compression spring 104c is seated between an annular ring 104d engaging the ball 104b at one end and the spring engages a snap ring 104e at its other end. For example, a blow-off spring pressure of 65 lbs. may be applied to the ball 104b through the spring 104c as a safety measure to prevent excessive pressure build up at the output space adjacent the pump means 30. The chamber 243 communicates with a port 244 provided in a body portion of the cooler supply valve 102. The port 244 communicates with a space or chamber 245 at one side of a spool 102s of the cooler supply valve. A rod end 102e limits movement of the spool 102s to the right relative to a side wall 102w of the body of the cooler supply valve 102. A spring 248 normally biases the spool 102s and rod end 102e thereof to the right as shown in Fig. 5. An end member 248a provides a fluid seal and a reaction means for spring 248 and engages a snap ring 248b. Preferably, the spring 248 exerts a force appreciably smaller than the force of the blow-off valve spring 104c and, for purposes of illustration, a value of five p.s.i. is given for the strength of the spring 248. This means that whenever transmission fluid medium in chambers 240—243 from the output of the pump means 30 is above a fluid pressure of 5 p.s.i., the spool 102s is shifted to the left as represented in Fig. 5 thereby connecting the port 244 with port 246 and a chamber 249 which is formed inside an enlarged portion 250 of the pump means housing and which communicates through a conduit 252 with a cooler 254 represented schematically in the diagram of Fig. 5.

The cooler 254 may include any heat exchanging means which are conventionally provided for cooling fluid through conduction of heat by way of tubing inside a heat exchanger (not shown) to another fluid used as a cooling medium. Structure of cooler 254 possibly could be added to structure of transmission cooler 178. In any event, cooled transmission fluid medium under pressure is forced from the cooler 254 through a conduit 256 to a port $D_1$ provided with the brake cooling valve 156.

The brake cooling valve 156 is provided with a spool 156s normally biased to the left by a compression spring 258 located between a right end surface 156e of the spool 156s and one side surface of an end sealing member 258a retained by a snap ring 258b at one end of a body of the brake cooling valve 156. Surrounding end surface 156e of the spool 156s there is formed a land 156a which is movable under fluid pressure against the bias of spring 258. Moving land 156a to the right results in an uncovering of a discharge port $D_2$ for permitting communicating flow of transmission fluid medium from port $D_1$ by way of an annular chamber 260 formed around an intermediate portion of the spool 156s between land 156a and a land 156b. The land 156b is located adjacent an end chamber 262 which receives transmission fluid medium under pressure through a port $T_2$ of the brake cooling valve 156 by way of a conduit 264 connected with the port $T_2$ of the dispatch valve 100 described above. The conduit 262 connects with the dispatch valve 100 adjacent to the conduit 210 which supplies transmission fluid medium under pressure to the chamber 220 for actuation and energization of the pump means 30 whenever the hydraulic service brakes of the vehicle are actuated. Thus the spool 156s of the brake cooling valve is shifted to the right whenever transmission fluid medium under pressure is supplied to the chamber 262 and this results in connecting the ports $D_1$ and $D_2$ of the brake cooling valve for supply of cooled transmission fluid medium from cooler 254 and conduit 256 to a conduit 266 connected with brake cooling chambers adjacent braking surfaces indicated schematically by numeral 268 in Fig. 5. For purposes of illustration, reference numeral 268 is also indicated in Fig. 3 in the schematic portion of the hydraulic brake system for a chamber adjacent to brake drum 124. Such a chamber 268 can be provided also adjacent to the brake shoe 122 or between friction means of disc type brakes but is not shown in such a location since the one example suffices to illustrate the function and purpose. Also for purposes of illustration, reference numeral 268 is applied to a space adjacent to the discs 64 and 66 of the propeller shaft brake means 20 illustrated and described in Fig. 1.

Thus cooled transmission fluid medium is channeled for brake cooling to a chamber with the service brakes or the propeller shaft brake in response to the shifting movement of the spool 156s in the brake cooling valve 156 of the system in Fig. 5.

In the system of the present invention, the pressure of fluid transmitted from chambers 240—243—245 to the chamber 249 communicating through conduit 252 with the cooler 254 is regulated by blow-off valve 104 to assure cut off of the supply of fluid medium to the cooler before any damage due to excessive fluid pressure can be done to the cooler. The blow-off valve 104 provides a safety release of excessive pressure by movement of the ball 104b out of engagement with the seat 104a for dumping transmission fluid medium adjacent the blow-off valve at a point marked X which communicates directly back with the sump 50. Various other points marked X in the system of Fig. 5 also indicate dumping to the sump. A pressure regulating effect for protection of a brake apply piston and chamber to be described later as well as for protection of cooler 254 occurs relative to the spool 102s of the cooler supply valve 102 and pressure regulator spool 108s as fluid under pressure is supplied and contained in chamber P to the left of the spool 102s and below a land 108a of spool 108s above fluid under pressure supplied through chamber 108p. Excess pressure in chamber 108p reflected through supply conduit 270c directly from chamber 245 and also indirectly by back pressure reflected from chamber P and a conduit 270 will shift spool 108s upwardly against spring 189 so that a land 108b is shifted upwardly to uncover a port also connected to dump marked point X. A land 108a of spool 108s moves upwardly to block port D receiving fluid under pressure from conduit 270c when there is excess pressure in chamber 108p thereby protecting the brake apply piston and chamber against excess pressure. A conduit 270p connects with the chamber P of the cooler supply valve and receives transmission fluid medium through the line 270 connected to a port chamber 108p formed at one end of the pressure regulator valve 108. Fluid medium under pressure is supplied through a connection 270a between a port P' of the pressure regulating valve 108 which communicates through an annular space 270b formed around an intermediate portion of the spool 108s of the pressure regulating valve 108 and receives fluid under pressure through a conduit 270c connected between a port D adjacent to chamber 270b of the pressure regulating valve 108 and a port adjacent to chamber 245 to the right of the spool 102s of the cooler supply valve 102. If pressure in chamber 108p is not excessive, then the land 108b closes and covers the dump port of the pressure regulator valve 108 and fluid is supplied from the output of pump means 30 through the pressure regulating valve 108 through conduit 270 to a conduit 272 which is connected from conduit 270 to a port P in the dispatch valve 100.

When the land 100b of the spool 100s in the dispatch valve 100 is shifted to the right due to the presence of transmission fluid medium under pressure in end chamber 199c, the port P communicates with a port F connected through a conduit 274 with an auxiliary wheel cylinder 120a having a fluid pressure chamber 278 adjacent to a piston 280 which is shifted to energize braking elements such as brake shoe 122 into engagement with a braking surface or drum 124 mentioned in the schematic diagram of the service brake system in Fig. 3. Thus upon actuation of the service brakes causing fluid under pressure to actuate piston 112p in the hydraulic brake cylinder 112, the system of the present invention effects connection of conduit means providing a cooling flow of transmission fluid medium under pressure for cooling of braking surfaces and also provides a flow of transmission fluid medium under pressure through conduit means such as 272 and 274 to supplement brake actuation. Wheel cylinder 120a can be separate from wheel cylinder 120 as shown in Fig. 3 but could also be included as a portion of wheel cylinder 120. Also entirely different braking means separate from brake shoe 122 and drum 124 could be used to supplement brake actuation. The propeller shaft disc brake 20 of Fig. 1 can be adapted to exert this supplemental brake actuating force. As to supplementing brake actuation, for purposes of illustration, the actuation of the propeller shaft brake can be effected as a supplement to hydraulic service brake actuation when a conduit 274a, seen in Fig. 1 communicating with a chamber 278a is provided at one side of the annular member 70 which is used hydraulically to force friction material of disc 64 into braking engagement with the stationary or nonrotatable discs 66 in the propeller shaft disc brake means 20.

The pressure of transmission fluid medium supplied through the conduit 274 or 274a is regulated by pressure regulator valve 108 and blow off valve 104 and this pressure, unless relieved by the pressure regulator valve or blow off valve, is proportional to the speed of the propeller shaft 10 because the pump means 30 is driven by the propeller shaft. The fluid pressure in chamber 220 causing upward movement of the sliding member 38 in the pump means 30 is also proportional to the speed of the propeller shaft 10 since the rear pump 14 of the hydrodynamic transmission also is driven by the shaft 10 and the pressure of fluid supplied by rear pump 14 remains proportional unless pressure regulator valve 164 functions to relieve any excess pressure. The fluid medium output of pump 30 thus is fed in proportion to speed of the propeller shaft and a supply of a portion of this volume is controlled by the pressure regulator valve 108 which in turn is affected and controlled in proportion to degree of actuation of the brake master cylinder such as is effected through a foot pedal to linkage connected to the spool of master control valve 106 which is engaged by spring 189 that also engages an end 192 of spool 108s of the master control valve 106. In effect there is a dynamic braking signal dependent upon force applied to the brake pedal actuation that affects how much volume of regulated transmission fluid medium is circulated under pressure by pump means 30 in the system of the present invention.

The pressure of transmission fluid medium transmitted through conduit 270 to conduit 270p exerts a force from the chamber P of the cooler supply valve on one side of spool 102s that is counteracted and generally overcome by the force of pressure from the transmission fluid medium in chamber 245 on the opposite side of the spool 102s. Thus in effect there is a pressure regulation function served by the cooler supply valve to further assure that pressures of the fluid medium transmitted into chamber 249 and conduit 252 to the cooler 254 never become excessive so as to endanger the cooler. A further pressure regulating function is served by the pressure regulating valve 108 in which a land 108a can be shifted upwardly under urging of pressure from the fluid medium chamber 108p against the bias of spring 189. Whenever the pressure in chamber 108p of the pressure regulating valve 108 exceeds the force of spring 189, the land 108a is shifted upwardly to restrict and finally to block off passage between port D and port P' in the pressure regulating valve 108 so as to control the pressure of transmission fluid medium transmitted to the conduits 270, 270p, and 272. Whenever the pressure exceeds a predetermined value and the land 108a is shifted upwardly, the land 108b is also shifted upwardly thus exposing a port X which is connected to dump excess fluid under pressure from chamber 270b back to the reservoir or sump 50.

The master control valve 106 is also provided with a port X for connecting port $T_1$ and conduit 198 to dump for returning transmission fluid medium to the sump or reservoir 50 after the service brakes are deenergized and fluid pressure is decreased in chamber 119c of the brake cylinder 112. When the service brakes are de-energized the linkage 158 and rod 188 return to a position wherein port T and port $T_1$ of the master control valve are blocked from communicating with each other thereby relieving pressure in end chamber 199c, in chamber 220, and in chamber 262, respectively, thereby de-activating the dispatch valve, the pump means, and the brake cooling valve described above.

Assuming now that the service brakes are no longer actuated hydraulically, a manual actuation of the system of the present invention can be effected through the lever 130 of the parking brake for setting the propeller shaft brake as described with Fig. 3. The lever or link 134 attached to shaft 82 is shown in Fig. 5 together with the pawl 152 that engages a rod end 140e of a spool 140s. The parking valve 140 is provided in a valve body common with the valve body of the brake cooling valve 156. The spool 140s includes a first land 140a and a second land 140b. With the lever or arm 134 in a resting position wherein the propeller shaft brake is not actuated, the land 140b of spool 140s blocks a port T of the parking valve 140 so that transmission fluid medium is prevented from entering a space 286 provided between the lands 140a and 140b of the spool of the parking valve 140. Whenever the propeller shaft brake is manually actuated, the arm 134 is turned clockwise so that shaft 82 causes pawl 152 also to turn clockwise thereby shifting rod end 140e to the left with the spool of the parking valve 140 against the bias of a spring 288 seated between the land 140b and an end sealing member 288a retained by a snap ring 288b relative to the valve body of the parking valve 140. As soon as the land 140b is shifted to the left in the parking valve 140, the port T can communicate through the annular space 286 with a port $T_3$ which is connected through a conduit 290 to a port $T_3$ adjacent to the dispatch valve 100.

Since the hydraulic actuation of the service brakes is not occurring when manual actuation is effected for the propeller shaft brake, there is no fluid medium pressure in the end chamber 199c and the spring 200 has shifted the spool 100s of the dispatch valve to the left as shown in Fig. 5 to a limit of travel determined by an end 199e of the spool 100s abutting against the left wall of the valve body for the dispatch valve to limit leftward movement of the spool 100s. In this position the land 100b blocks port P of the dispatch valve and the land 100a connects the port F for return of fluid medium from the brake apply piston chamber 278 through conduit 274 to dump through a port X which communicates with sump or reservoir 50. However the annular space 202 between the lands 100b and 100c provides communication between port $T_2$ and port $T_3$ of the dispatch valve 100, so that, during manual application of the parking brake, transmission fluid medium under pressure passes through the conduit 290, port $T_2$ and port $T_3$ of the dispatch valve to the conduit 210 and conduit 264 described above. As soon as fluid under pressure is supplied to the conduits 210 and 264, the slide member 38 of the pump means 30 is actuated upwardly and the spool 156s of the brake cooling valve 156 is actuated as described above. Since the pressure regulating valve 108 during normal functioning of the system in the present invention has the land 108a located in a position where port D of valve 108 is at least one half or more open, fluid under pressure can be pumped by the pump means 30 to the fluid output chamber 240 and conduit 242 to the chamber 245 and through the conduits 270c, port D, space 270b, conduits 270a and 270 as well as to the cooler 254 in the same manner as described for the operation of the system of the present invention during hydraulic service brake actuation. The land 100b of displatch valve spool 100s blocks fluid action of brake apply piston using fluid from conduit 270 to line 272 where fluid is prevented from passing to line 274. However, cooled transmission fluid medium will again flow from the cooler 254 through the brake cooling valve 156 by way of ports $D_1$ and $D_2$ to the brake cooling chamber 268 whenever fluid under pressure is supplied to the chamber 262 for shifting the spool 156s of the brake cooling valve 156 to the right as viewed in Fig. 5 and causing dump port X of brake cooling valve 156 to be closed and covered by land 156b.

The operation of the system in the present invention described so far has covered instances where brake cooling and brake actuation is brought about through hydraulic service brake actuation or by manual propeller shaft brake actuation. However, the system in the present invention also provides a third and temperature-responsive spontaneous type of actuation that occurs for effecting flow of transmission fluid under pressure for cooling the transmission fluid medium itself without parking or service brake actuation. For the third or temperature-responsive spontaneous type of actuation, there is pumping by the pump means 30 forcing transmission fluid medium through the cooler and back to the sump whenever the temperature of the transmission fluid medium in the sump 50 exceeds a predetermined minimum value such as 250° or 280°. Fluid is less viscous when warmer and thus a temperature of 250° F. or more is permitted in sump 50 so that pump means can circulate the fluid medium freely and easily. As soon as the temperature of the fluid medium in the sump rises above a predetermined value to 280° for example, the "Varnatherm" or temperature responsive valve means 110 respond with expansion of fluid in end portion 212 such that the spool 110s of the temperature responsive valve means is shifted upwardly in Fig. 5. The upward shifting action can occur due to an expansion of a thermal responsive means or fluid in the lower end portion 212 of the "Vernatherm" as mentioned earlier. When the spool 110s shifts upwardly, the ports $T_2$ and C of the temperature responsive means 110 are blocked and can no longer communicate with each other. At the time that the land 110b blocks off port $T_2$ but does not block off the port C, the "Vernatherm" has shifted spool 110s to its designed intended limit against spring 110z and the land 110a is shifted above port T of the temperature responsive valve means 110 to provide an upper communicating passage between port T of the temperature responsive valve means through annular passage 216 to the port C thereby directly passing transmission fluid medium from the conduit 180 to the chamber 220 by way of conduit 218 for upward movement of the slide member 38 for pumping activation of the propeller shaft pump means 30.

When this temperature-responsive spontaneous energization of the pump means occurs at times other than when the hydraulic or manual brake mechanisms are applied, both the dispatch valve and the brake cooling valve remain in the positions shown in Fig. 5 and the pump means 30 circulate transmission fluid medium from the output chamber 240 through conduit 242 to the cooler supply valve causing a shifting of the spool 102s of the supply valve permitting fluid medium to pass to the cooler 254 and then by way of conduit 256 to the port D through annular space 260 and port X of the brake cooling valve 156 for dumping cooled fluid medium back into the reservoir or sump 50. This operation continues so long as the temperature of the transmission fluid medium exceeds the predetermined minimum temperature for actuation of the "vernatherm" or temperature responsive valve means 110 and this operation can occur anytime or for holding the pump means 30 in pumping position after brake actuation and for after cooling. After sufficient cooling of the fluid medium the "vernatherm" fluid in end 212 contracts and permits spool 110s to move back to the position shown in Fig. 1. During the time that spontaneous actuation of the pumping means 30 occurs in response to actuation of the vernatherm or temperature responsive valve 110 due to excessive heating of the transmission fluid medium in the sump 50, no pressure is supplied to the end chamber 199c or the chamber 262 of the dispatch valve 100 or brake cooling valve 156, respectively, and therefore, none of the cooling flow of fluid medium under pressure from the pump means 30 is transmitted to the service brakes or to the propeller shaft brake. The cooler 254 is provided in addition to the cooler 178 described with the hydrodynamic transmission because the cooler 178 of the hydrodynamic transmission is designed to dissipate only the heat generated by operation of the hydrodynamic transmission itself. It is to be understood that in the event that the heat dissipating capacity of the cooler 178 can be increased, the cooler 254 could be eliminated and conduits 252 and 256 could be connected to operate through the cooler 178 in the same manner that conduits 179 and 181 described with the hydrodynamic transmission operate with the cooler 178. It is preferred however that a separate cooler such as 254 is provided in the system of the present invention to permit dissipation of heat transmitted to the transmission fluid medium from the service brakes, the propeller shaft brake and also as an auxiliary cooler for the transmission-transmitted heat when the cooler 178 proves inadequate to cool all of the transmission fluid medium passing through the sump 50 at one time or another in the operation of the system of the present invention with the hydrodynamic transmission as described.

The cooling of the service brakes and of the propeller shaft brake assures that friction materials used therein are not burned up or damaged due to excessive heat. Further, the cooling of braking surfaces as effected during manual mechanical brake actuation or during hydraulic brake actuation or spontaneous cooling of the fluid medium itself in the system of the present invention assures that brake fading due to excessive heating will not occur. Whenever pumping means 30 is actuated due to "Vernatherm" operation, and/or hydraulic or mechanical brake actuation, there is a volume of transmission fluid medium supplied in proportion to speed of the pump rotor but governed by pressure regulating means. The disc type propeller shaft brake can be used in combination with wheel cylinders for front wheels only and due to propeller shaft brake actuation concurrent with brake cooling and during mechanical or hydraulic brake actuation, use of wheel cylinders for rear wheel brakes can be eliminated if desired. Transmission fluid medium is used for brake actuation. Furthermore, the "Vernatherm" or temperature responsive valve means provided in the present invention assures that transmission fluid medium can be adequately cooled even when the manual and hydraulic brake actuating mechanisms are not applied to effect brake and fluid medium cooling. Thus the fluid is maintained at a lower temperature and will be more effective to provide quick and efficient brake cooling during subsequent brake actuation.

While the embodiments of the present invention as herein disclosed constitute a preferred form, it is to be understood that other forms might be adopted.

What is claimed is as follows:

1. In combination with a hydro-kinetic automatic transmission having at least one pump on a motor vehicle also having a braking means including passage-forming conduit means as well as an adjoining brake cooling chamber that communicates therewith in predetermined locations and provided for application of driving as well as braking force, respectively, upon a vehicle torque-transmitting propeller shaft, a system for controlling braking means application and cooling, comprising, a source of transmission fluid medium, a pumping means including a rotor as well as a slider member that is cooperable with the rotor thereof carried by the propeller shaft and capable of being actuated by use of transmission fluid medium supplied under pressure from one pump of the transmission, a dispatch valve to govern passage of the transmission fluid medium for supply thereof by conduit means from said source under pressure due to the one transmission pump to a location adjacent to the slider member of said pumping means for urging the member into cooperation with the rotor of said pumping means, a master control valve actuated concurrently upon brake actuation and provided to control connection of passage-forming conduit means to establish communication from said source through said dispatch valve to the chamber for brake cooling, a cooler and a cooler supply valve connected in series with suitable passage-forming conduit means to join said pumping means and the brake cooling chamber for circulation of transmission fluid medium used for transfer of heat from the braking means, said cooler serving to dissipate heat from transmission fluid medium used for cooling the braking means, and a pressure regulating valve means provided adjacent to said master control valve for dispatching transmission fluid medium under pressure from the one transmission fluid pump by the way of further passage-forming conduit means from said pumping means for regulating fluid pressure on one end of said cooler supply valve opened for circulation of transmission fluid medium as well as to govern fluid pressure for said braking means application.

2. In combination with a hydro-kinetic torque converter transmission having at least one pump on a motor vehicle also having a torque-transmitting propeller shaft joined to the transmission, a fluid system and means for utilization of transmission fluid medium, both to cool as well as transmit force by the same fluid medium adapted to circulate to a brake apply piston chamber of braking means of the vehicle and having suitable passage-forming conduit means to interconnect predetermined components thereof, comprising, a source of transmission fluid medium under pressure, a propeller-shaft driven pumping means including an output chamber for transfer of fluid medium thereto from said source, a pressure regulating valve connected in series with a passage-forming conduit means leading from the output chamber of said pumping means to the brake apply piston chamber, a dispatch valve having a shiftable spool to cover and uncover predetermined ports including some provided for making servo-connection controlling supply of transmission fluid medium under pressure to the brake apply piston chamber, a cooler connected in series with another passage-forming conduit means leading from said pumping means output chamber to a brake cooling chamber and back to said source, a cooler supply valve provided adjacent to said cooler and having a spool movable to open circulation to said cooler and the spool is shifted by force transmitted from transmission fluid medium under pressure from said pumping means output chamber, a blow-off safety check valve located in communication with a passage-forming conduit means joined between the pumping means output chamber and the source and serving to relieve excess fluid pressure, and a brake-cooling-control valve located in communication with a passage-forming conduit means joined between said cooler and brake cooling chamber and having a spool shifted by transmission fluid under pressure channelled to one end thereof through a passage-forming conduit means from a predetermined port of said dispatch valve after said dispatch valve is actuated by fluid pressure supplied to a chamber at one end thereof for shifting the spool of said dispatch valve to one side in response to brake means actuation that results in opening of a passage-forming conduit means from said source to the dispatch valve end chamber upon shift of the dispatch valve spool to uncover ports to establish transmission fluid medium communication for effecting brake cooling as well as a brake assisting operation due to supply of fluid under pressure to the brake apply piston chamber.

3. The combination of claim 2 in which said braking means includes a hydraulically-actuated service brake means and a manually actuated propeller shaft disc-type brake having complementary stationary and movable disc parts substantially axially aligned relative to each other, the brake cooling chamber being formed around and between cooperable stationary and movable disc parts of said brake, lever means pivotally carried axially to one side of said disc parts and adapted for mechanically transmitting manual actuating force to urge the disc parts frictionally into engagement with each other, and a piston member also provided axially to one side of the disc parts and located adjacent to the brake apply piston chamber so as to permit hydraulic actuation and assistance to brake actuation concurrent with supply of transmission fluid medium for cooling of the parking brake disc parts, said piston member transmitting a braking force in effect proportional to propeller shaft speed in driving the propeller shaft pumping means which supplies a volume of transmission fluid medium under pressure in proportion to speed of said pumping means.

4. The combination of claim 2 in which said braking means includes a hydraulically-actuated service brake means and a propeller shaft disc-type brake, and a valve means having a spool shifted to connect ports establishing communication for supply of transmission fluid medium through the dispatch valve to the brake cooling valve end chamber, and thus to shift the brake-cooling-control valve spool for permitting flow of transmission fluid medium under pressure to the brake cooling chamber from said cooler, said propeller shaft disc-type brake including a plurality of disc parts non-rotatable relative to the propeller shaft and a plurality of disc parts rotatable along with the shaft, and a piston member adjacent to the brake apply piston chamber, said piston member transmitting force of fluid medium pressure in the brake apply piston chamber thereby effecting the brake assisting operation supplemental to service brake actuation.

5. The combination of claim 1 in which the rotor of said pumping means carried by the propeller shaft is provided with a plurality of radially outwardly biased vanes engaged against said slider member that is urged toward the vanes by transmission fluid medium and a second slider member urged by gravity to engage the vanes also.

6. In a system for controlling flow of a fluid medium used in operation of at least one pump for a hydrodynamic transmission of a vehicle having a transmission-driven propeller shaft and heat-exchanging cooler to effect cooling of the fluid medium and also used with during actuation and cooling of vehicle brake structure having separate brake apply and cooling chambers, an assembly including a valve housing mechanism with predetermined passages therein and conduit-forming means therewith, a propeller-shaft-driven pump means carried by said valve housing mechanism and provided in addition to one pump of the hydrodynamic transmission, a disc-type propeller shaft brake means including stationary and rotatable discs forming at least part of brake structure and carried by said valve housing mechanism, and valving means adapted to establish connection of predetermined passages and conduit-forming means of said housing mechanism for effecting use of the transmission fluid medium forced under pressure by said pumping means to a brake cooling chamber in the housing mechanism in which the disc-type brakes are located and to the brake apply chamber such that the discs move and are urged into engagement with each other by pressure of the transmission fluid medium concurrently upon actuation of brake means of the vehicle.

7. A system for cooling and actuating brakes on a vehicle having a transmission-driven propeller shaft and heat-exchanging cooler, comprising, in combination, a temperature sensitive valve means as well as a source of transmission fluid medium adjacent thereto, means such as pistons, levers and the like for effecting actuation of braking means including a propeller shaft brake, a propeller shaft pump means that pumps transmission fluid medium for dissipation of heat to the cooler through which the fluid medium can circulate due to energization of the pump means in response to the temperature sensitive valve means, and that also pumps transmission fluid medium for cooling of the propeller shaft brake concurrently upon manual actuation of the brake and that also pumps transmission fluid medium for brake cooling and brake apply hydraulic actuation of said propeller shaft brake concurrently upon hydraulic service brake action.

8. The combination of claim 2 wherein said brake means includes a hydraulically operable service brake including a master cylinder, brake lines to wheel cylinders that have pistons for actuation of brake shoes and the like adjacent to brake drums and an independent hydraulic brake fluid source in communication with the cylinders and lines, lever means for urging pressurization of hydraulic brake fluid from said source to effect service brake operation, and a master control valve located adjacent to said pressure regulating valve for opening and closing passages for said transmission fluid medium to the brake cooling chamber and brake apply piston chamber as operated simultaneously with said service brake operation so as to effect pressurized flow of transmission fluid medium from said pump means.

9. The combination of claim 1 wherein said brake means includes a manually-operable parking brake and lever means adapted to effect parking brake operation simultaneously with operation of said cooler supply valve for initiating transmission fluid medium flow to said cooler for heat exchange and dissipation of heat transferred from said parking brake.

References Cited in the file of this patent

UNITED STATES PATENTS

| | | |
|---|---|---|
| 2,716,946 | Hardy | Sept. 6, 1955 |
| 2,758,684 | Stickel | Aug. 14, 1956 |
| 2,821,272 | Sanford et al. | Jan. 28, 1958 |
| 2,846,901 | Baule | Aug. 12, 1958 |